United States Patent
Kikuchi

(10) Patent No.: US 9,305,200 B2
(45) Date of Patent: Apr. 5, 2016

(54) INFORMATION ACQUISITION APPARATUS, INFORMATION ACQUISITION METHOD, AND NON-TRANSITORY RECORDING MEDIUM

(71) Applicant: CASIO COMPUTER CO., LTD., Shibuya-ku, Tokyo (JP)

(72) Inventor: Masaaki Kikuchi, Fussa (JP)

(73) Assignee: CASIO COMPUTER CO., LTD, Tokyo (JP)

( * ) Notice: Subject to any disclaimer, the term of this patent is extended or adjusted under 35 U.S.C. 154(b) by 0 days.

(21) Appl. No.: 14/598,284

(22) Filed: Jan. 16, 2015

(65) Prior Publication Data
US 2015/0205980 A1     Jul. 23, 2015

(30) Foreign Application Priority Data

Jan. 20, 2014 (JP) .................................. 2014-007582

(51) Int. Cl.
*G06K 7/10* (2006.01)
*G06K 7/14* (2006.01)

(52) U.S. Cl.
CPC .......... *G06K 7/1095* (2013.01); *G06K 7/10712* (2013.01); *G06K 7/1408* (2013.01); *G06K 7/1426* (2013.01)

(58) Field of Classification Search
None
See application file for complete search history.

(56) References Cited

U.S. PATENT DOCUMENTS

2013/0064371 A1* 3/2013 Moses et al. ................... 380/255
2013/0228624 A1* 9/2013 Byrd et al. ............... 235/462.11

FOREIGN PATENT DOCUMENTS

| JP | 2004-140823 | 5/2004 |
|---|---|---|
| JP | 2008-205774 | 9/2008 |
| JP | 2011-061305 | 3/2011 |
| JP | 2011-192236 | 9/2011 |
| JP | 2012-113655 | 6/2012 |
| JP | 2013-130919 | 7/2013 |

OTHER PUBLICATIONS

Office Action of Notification of Reasons for Rejection for Japanese Patent Application No. 2014-007582 dated Nov. 17, 2015, 12 pages.

* cited by examiner

*Primary Examiner* — Christle I Marshall
(74) *Attorney, Agent, or Firm* — Amin, Turocy & Watson LLP; Gregory Turocy

(57) ABSTRACT

The imager and controller of an information apparatus images the back face of another information apparatus to acquire the manufacturing number of the other information apparatus corresponding to the two-dimensional bar code provided on the back face of the other information apparatus and acquire visible light information corresponding to blinking of light emitted by the light emitter arranged on the back face of the other information apparatus. Furthermore, the controller controls the imager so as to be able to image the two-dimensional bar code and the light emitted by the light emitter.

12 Claims, 6 Drawing Sheets

FIG.5

| VISIBLE LIGHT INFORMATION | NO DEVICE MODEL INFORMATION | DEVICE MODEL A | DEVICE MODEL B |
|---|---|---|---|
| 0 | ERROR | RESTARTING | PLEASE REST |
| 10 | FAILURE | DANGER STOP USING | COOLING |
| 20 | 20% | REMAINING BATTERY 20% | REMAINING TIME 20 MINUTES |
| ⋮ | ⋮ | ⋮ | ⋮ |

INFORMATION ACQUISITION APPARATUS, INFORMATION ACQUISITION METHOD, AND NON-TRANSITORY RECORDING MEDIUM

CROSS-REFERENCE TO RELATED APPLICATION

This application claims the benefit of Japanese Patent Application No. 2014-007582, filed on Jan. 20, 2014, the entire disclosure of which is incorporated by reference herein.

FIELD

This application generally relates to an information acquisition apparatus, information acquisition method, and non-transitory recording medium.

BACKGROUND

In the prior art, information acquisition techniques utilizing a camera device mounted on communication devices such as cellphones have been known. For example, Unexamined Japanese Patent Application Kokai Publication No. 2004-140823 discloses a technique of reading a QR code (registered trademark) with a camera device and decoding the code to acquire information.

Furthermore, Unexamined Japanese Patent Application Kokai Publication No. 2011-61305 discloses a technique of performing visible light communication with a camera device and decoding the blinking or other pattern of the light to acquire information.

The present disclosure is made with the view of the above problem and an objective of the present disclosure is to provide an information acquisition apparatus, information acquisition method, and non-transitory recording medium capable of dealing with various information acquisition methods.

SUMMARY

In order to achieve the above objective, the information acquisition apparatus according to a first aspect of the present disclosure is comprising:

an imager;

a first decoder decoding a geometric pattern obtained by imaging by the imager to first information;

a second decoder decoding an optically changing time series pattern obtained by imaging by the imager to second information; and an imaging controller controlling the imager to image the geometric pattern and the optically changing time series pattern.

Furthermore, in order to achieve the above objective, the information acquisition method according to a second aspect of the present disclosure is including:

an imaging step;

a first decoding step of decoding a geometric pattern obtained by imaging in the imaging step to first information;

a second decoding step of decoding an optically changing time series pattern obtained by imaging in the imaging step to second information; and an imaging controlling step of controlling to image the geometric pattern and the optically changing time series pattern in the imaging step.

Furthermore, in order to achieve the above objective, the non-transitory recording medium according to a third aspect of the present disclosure is a computer-readable non-transitory recording medium storing a program for causing the computer to function as:

an imager;

a first decoder decoding a geometric pattern obtained by imaging by the imager to first information;

a second decoder decoding an optically changing time series pattern obtained by imaging by the imager to second information; and an imaging controller controlling the imager to image the geometric pattern and the optically changing time series pattern.

BRIEF DESCRIPTION OF THE DRAWINGS

A more complete understanding of this application can be obtained when the following detailed description is considered in conjunction with the following drawings, in which:

FIG. 5 is a drawing showing the correspondence between the visible light information and device model, the detailed state information, and simplified state information;

DETAILED DESCRIPTION

A specific embodiment will be described hereafter using the drawings.

Figure 1:
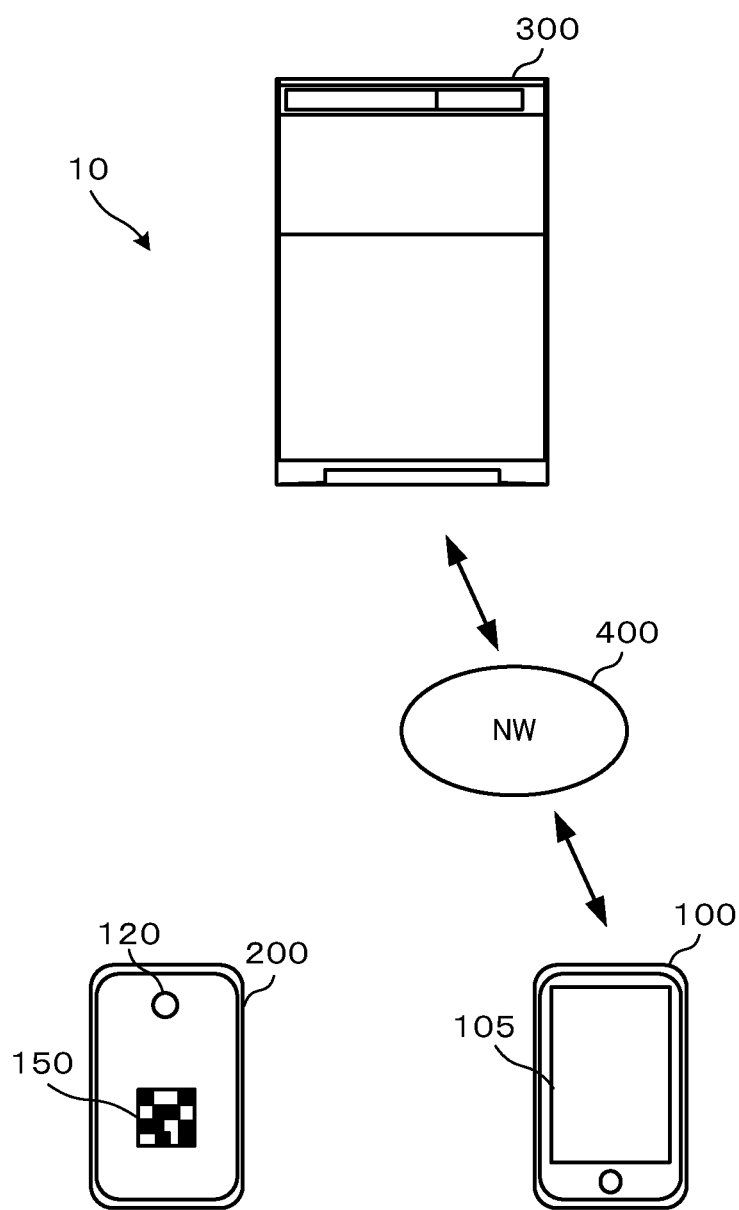
FIG. 1 is a drawing roughly showing the configuration of the communication system according to an embodiment of the present disclosure.

FIG. 1 roughly shows the configuration of a communication system. As shown in FIG. 1, a communication system 10 comprises an information apparatus 100 and information apparatus 200 as information acquisition apparatuses, a service server 300, and a network (NW) 400.

The information apparatuses 100 and 200 have the same configuration in which a display 105 is arranged on the front face of the housing and a light emitter 120 and a printed (or formed by sticker attachment) two-dimensional bar code 150 such as a QR code (registered trademark) are arranged on the back face of the housing.

The information apparatuses 100 and 200 are apparatuses capable of wireless communication (for example, cellphones or smart phones). The information apparatuses 100 and 200 perform wireless communication by visible light (Hereafter referred as visible light communication) with each other.

In this embodiment, one of the information apparatuses 100 and 200 acquire information by imaging light emitted by the light emitter 120 of the other information apparatus (information apparatus 100 or 200) and the two-dimensional bar code.

In this embodiment, information corresponding to the light from the light emitter 120 is information with which the state of one of the other of the information apparatuses 100 and 200 can be specified. And a part of information corresponding to the above-mentioned two-dimensional bar code is information of the manufacturing number of one of the other of the information apparatuses 100 and 200. Furthermore, the information apparatuses 100 and 200 perform wireless communication with the service server 300 via the NW 400 in accordance with a standard such as LTE (long term evolution) or 3G.

The service server 300 receives the information of one of the other information apparatuses 100 and 200 which one of the information apparatuses 100 and 200 acquired through visible light communication based on light from the light emitter 120.

Furthermore, the service server 300 transmits, based on acquired information, location information (URL) indicating where information indicating the state of the other of the information apparatuses 100 and 200 (detailed state information or simplified state information) is located on the NW 400 to the one of the information apparatuses 100 and 200 through wireless communication.

One of the information apparatuses 100 and 200 acquires, based on the received location information, apparatus state information indicating the state of the other information apparatuses 100 and 200. The visible light communication and acquisition of the apparatus state information by the information apparatus 100 will be described later in detail.

Figure 2:
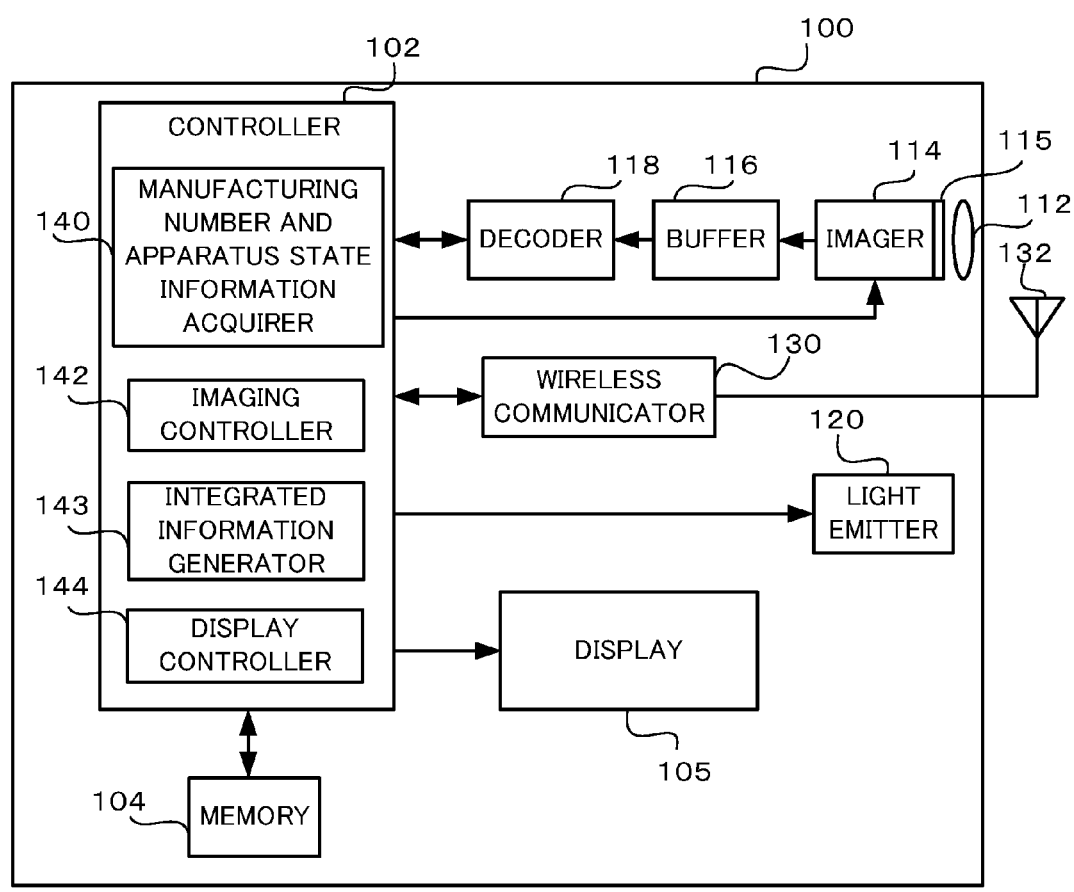
FIG. 2 is a block diagram showing the configuration of an information apparatus.

FIG. 2 is a block diagram showing the configuration of the information apparatus 100.

As shown in FIG. 2, the information apparatus 100 comprises a controller 102, a memory 104, a display 105, a lens 112, an imager 114, a buffer 116, a decoder 118, a light emitter 120, a wireless communicator 130, and an antenna 132. The information apparatus 200 has the same configuration.

The controller 102 is constituted by, for example, a CPU (central processing unit). The controller 102 controls various kinds of functions of the information apparatus 100 by executing software procedures according to programs stored in the memory 104 (for example, a program for realizing the operation of the information apparatus 100 shown in FIG. 3 described later). The controller 102 comprises a manufacturing number and apparatus state information acquirer 140, an imaging controller 142, an integrated information generator 143, and a display controller 144.

The memory 104 is, for example, a RAM (random access memory) or a ROM (read only memory). The memory 104 stores various kinds of information (programs and the like) used for control in the information apparatus 100 and the like.

The display 105 is constituted by, for example, a LCD (liquid crystal display), PDP (plasma display panel), EL (electroluminescence) display or the like. The display 105 displays images according to image signals output from the controller 102 (for example, a live-viewing-image, an image of manufacturing number of an information apparatus, an image of apparatus state information or the like, which will be described later).

The lens 112 is constituted by a zoom lens and a focusing lens. The lens 112 operates according to the focus control by the controller 102 and controls the field angle and optical image of the images imaged by the imager 114.

The imager 114 is constituted by multiple light receiving elements regularly arranged in a two-dimensional array on the light receiving surface 115. The light receiving elements are, for example, imaging devices such as CCDs (charge coupled devices) and CMOSs (complementary metal oxide semiconductor). The imager 114 images (receives light of) an optical image entered through the lens 112 with a field angle in a predetermined range based on control signals from the controller 102, and converts the image signals within the field angle to digital data to generate a frame that is one image. Furthermore, the imager 114 successively executes imaging and frame generation, and sequentially stores successive frames in the buffer 116.

Furthermore, the imager 114 determines the brightness in the same region of each of a predetermined amount of frames.

As a result of the determination, when the brightness in a predetermined region within the field angle changes significantly such as when the brightness is equal to or higher than a first predetermined value in one frame and equal to or lower than a second predetermined value in another frame, that predetermined region is assumed to be a blinking point generated as a result of receiving light from the light emitter 120 of the other information apparatus 200.

When there is a blinking point, the imager 114 generates a bit data string representing the mode of change in brightness in the region of the blinking point in frames (Hereafter referred as "the bright spot region,") between predetermined amount of frames over time by representing light-on with "1" and light-off with "0", and stores and updates the bit data string in the coordinates data list constituted in the buffer 116.

In this embodiment, the bit data string is eight bits and represents information with which the state of the information apparatus that is a transmission source can be identified (visible light information) by the binary number system. The controller 102 acquires, based on this information with which the state of the information apparatus that is a transmission source can be identified, information presenting the state of the information apparatus that is a transmission source (apparatus state information).

The decoder 118 reads out, based on control signals from the controller 102, frames stored in the buffer 116 and adjusts image quality and image size and outputs to display as a live-viewing-image on the display 105. The controller 102 recognizes the two-dimensional bar code 150 based on the frames and, further, acquires the manufacturing number of the other information apparatus 200 presented by the two-dimensional bar code 150.

The wireless communicator 130 is constituted by using, for example, a radio frequency (RF) circuit, base band (BB) circuit, or the like.

The wireless communicator 130 transmits and receives radio signals via the antenna 132.

Furthermore, the wireless communicator 130 encodes and modulates transmission signals and demodulates and decodes reception signals.

The light emitter 120 incorporates a light-emitting body such as an LED (light emitting diode). The light emitter 120 executes, based on control signals from the controller 102, blinking according to the bit data string in which its own manufacturing number of information apparatus is represented by the binary number system where "1" means light-on and "0" means light-off.

Next, operations of the visible light communication and acquisition of apparatus state information of the information apparatus 100 will be described.

Figure 3:
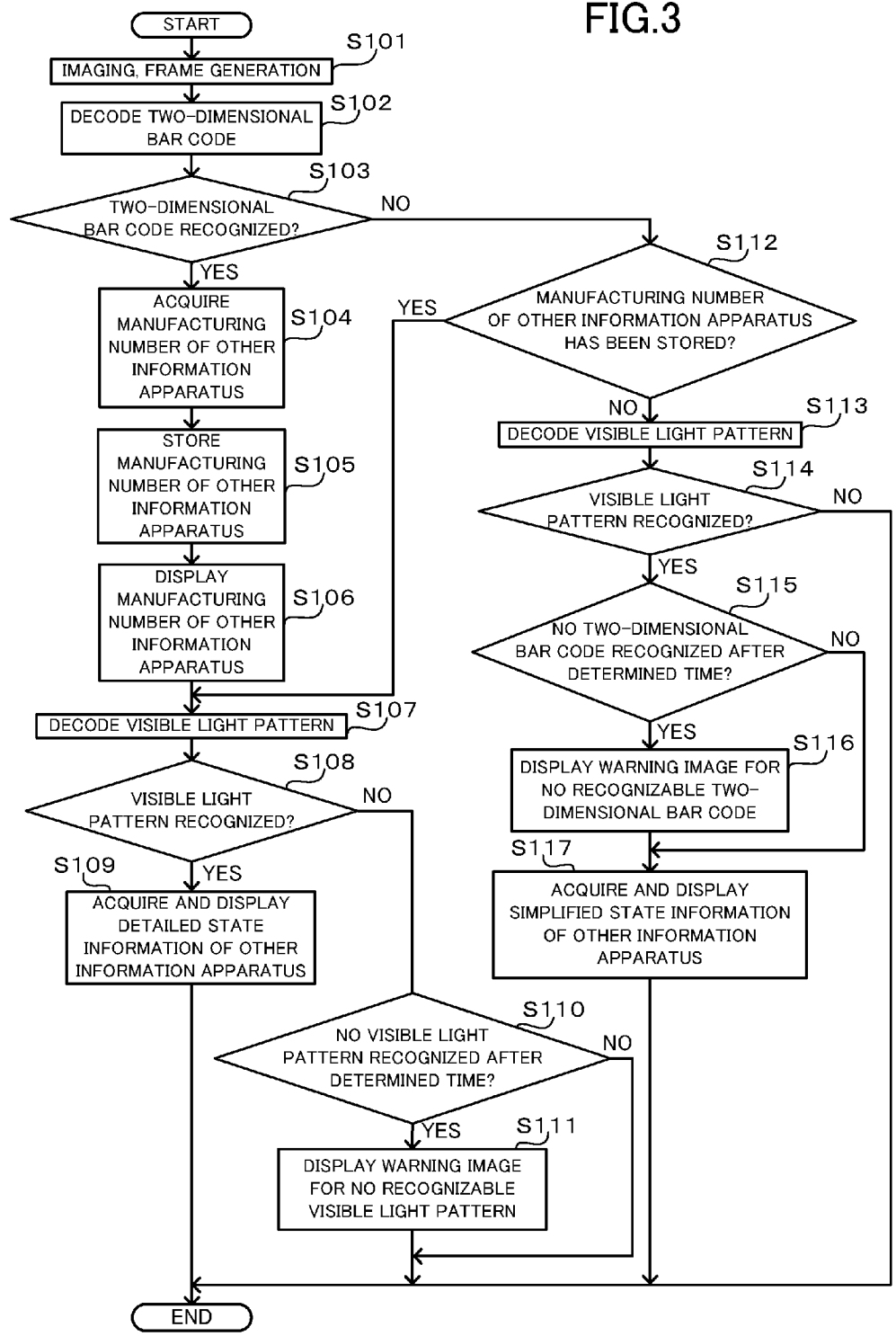
FIG. 3 is a flowchart showing operations of the visible light communication and acquisition of apparatus state information of the information apparatus.

FIG. 3 is a flowchart showing operations of the visible light communication and acquisition of apparatus state information of the information apparatus 100.

The operations shown in FIG. 3 are started by the execution of a program for visible light communication and acquisition of apparatus state information, and is executed in every cycle in which one frame is generated by imaging (for example, 1/30 second) or in every cycle which is predetermined times (for example, double) longer than the cycle in which one frame is generated by imaging.

Further, program for the visible light communication and acquisition of apparatus state information in this embodiment is an application program enabling both of recognition of visible light patterns corresponding to blinking of light from the light emitter 120 and recognition of the two-dimensional bar codes 150.

First, the imager 114 of the information apparatus 100 images the back face of the other information apparatus 200 with a field angle in a predetermined range according to the user's operation, and converts the image signals within the field angle to digital data to generate a frame that is one image (Step S101).

The frame is stored in the buffer 116.

The decoder 118 reads the frame stored in the buffer 116, adjusts the frame in image quality and image size to display the frame as a live-viewing-image on the display 105, and outputs the frame to the controller 102.

The manufacturing number and apparatus state information acquirer 140 of the controller 102 decodes (recognizes) the two-dimensional bar code within the input frame (Step S102). Specifically, the manufacturing number and apparatus state information acquirer 140 acquires and tries to recognize two-dimensional bar code 150 within the frame by known image recognition procedures.

Then, the manufacturing number and apparatus state information acquirer 140 determines whether the two-dimensional bar code 150 is recognized (Step S103). If the two-dimensional bar code 150 is recognized (Step S103; YES), the manufacturing number and apparatus state information acquirer 140 acquires information of manufacturing number of the other information apparatus 200 that is a part of information corresponding to the two-dimensional bar code 150 (Step S104), and stores the information of manufacturing number in the memory 104 (Step S105).

Then, the display controller 144 of the controller 102 displays an image of the information of manufacturing number of the other information apparatus 200 stored in the memory 104 on the display 105 in a manner that the image of information of manufacturing number is superimposed on a live-viewing-image obtained by imaging the other information apparatus 200 (Step S106).

Figure 6A:
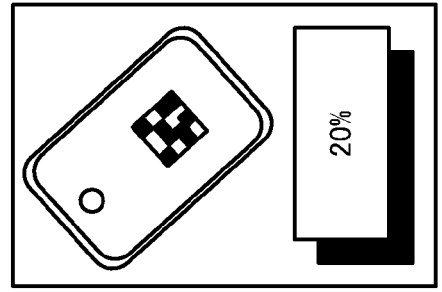
FIG. 6A is a drawing showing an exemplary image display by the information apparatus.

Consequently, for example, as shown in FIG. 6A, a live-viewing-image obtained by imaging the other information apparatus 200 and an image of the image of the information of manufacturing number of the other information apparatus 200 superimposed on the live-viewing-image are displayed on the display 105.

Returning to FIG. 3, description will be continued.

Next, the imager 114 and manufacturing number and apparatus state information acquirer 140 decodes the visible light pattern (Step S107).

Specifically, the imager 114 generates a bit data string in which light-on is represented by '1' and light-off is represented by "0" based on change in brightness between the frames over time in the region of the blinking points generated by light emitted from the light emitter 120 (bright spot region) in each of predetermined amount of frames.

Subsequently, the bit data string is stored and updated in the coordinates data list constituted in the buffer 116.

The manufacturing number and apparatus state information acquirer 140 acquires and tries to convert the bit data string to visible light information. The visible light information is, for example, a numeric value "20" in "REMAINING BATTERY 20%" or "REMAINING TIME 20 MINUTES" shown in FIG. 5.

Then, the manufacturing number and apparatus state information acquirer 140 determines whether any visible light pattern is recognized (Step S108). If any visible light pattern is recognized (Step S108; YES), the controller 102 acquires detailed state information representing the detailed state of the other information apparatus 200 and displays the detailed state information on the display 105 (Step S109).

Figure 4:
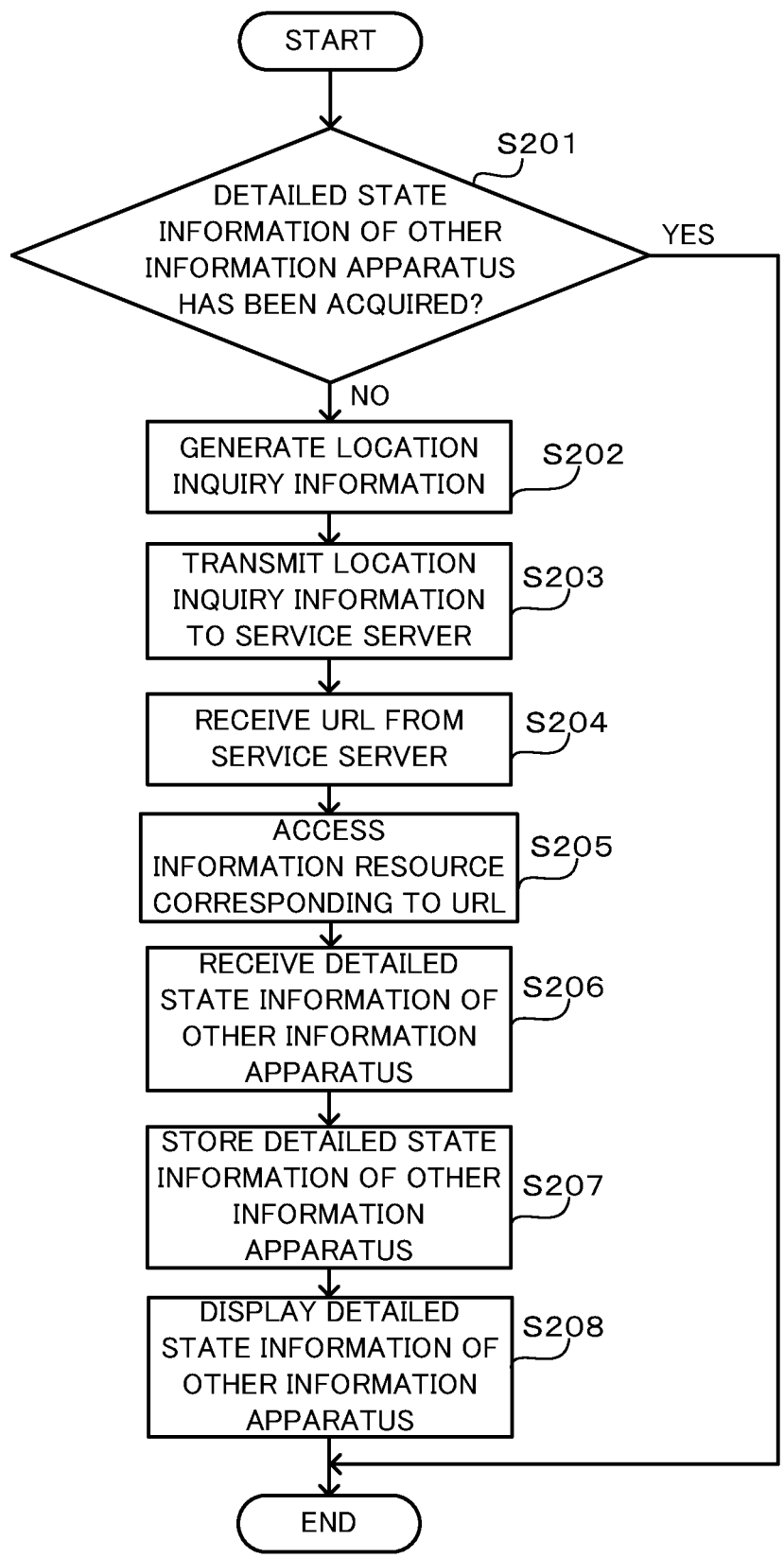
FIG. 4 is a flowchart showing operations of acquisition and displaying of the detailed state information of the information apparatus.

FIG. 4 is a flowchart showing the operation of acquisition and displaying of the detailed state information of the other information apparatus 200 performed by the controller 102 in the Step S109.

The manufacturing number and apparatus state information acquirer 140 of the controller 102 determines whether the detailed state information of the other information apparatus 200 has been acquired (Step S201).

For example, when a program for the visible light communication and acquisition of apparatus state information is executed and the detailed state information of the other information apparatus 200 is stored in the memory 104, the detailed state information of the other information apparatus 200 is stored in the memory 104 until the execution of the program for the visible light communication and acquisition of apparatus state information is over.

In such a scenario, the manufacturing number and apparatus state acquirer 140 determines whether the detailed state information of the other information apparatus 200 is stored in the memory 104.

If the detailed state information of the other information apparatus 200 has been acquired (Step S201; YES), the operation of acquisition and displaying of the detailed state information of the other information apparatus 200 is terminated.

On the other hand, if the detailed state information of the other information apparatus 200 has not been acquired (Step S201; NO), the integrated information generator 143 of the controller 102 generates location inquiry information for inquiring, to the service server 300, for the location (URL) of information resource which holds the detailed state information of the other information apparatus 200 (Step S202).

The location inquiry information contains the manufacturing number of the other information apparatus 200.

Next, the integrated information generator 143 transmits the location inquiry information to the service server 300 via the wireless communicator 130, antenna 132, and NW 400 (Step S203).

The service server 300 specifies, based on the manufacturing number of the other information apparatus 200 in the received location inquiry information, the location (URL) of information resource which holds the detailed state information of the other information apparatus 200 corresponding to the manufacturing number, and transmits the location (URL) of the information resource to the information apparatus 100.

The integrated information generator 143 receives the location of the information resource (URL) via the NW 400, antenna 132, and wireless communicator 130 (Step S204).

Next, the integrated information generator 143 accesses the information resource indicated by the location (URL) of the information resource (Step S205).

Specifically, the integrated information generator 143 generates access information including the manufacturing number of the other information apparatus 200 and access information resource not shown in drawings by transmitting the access information via the wireless communicator 130, antenna 132, and NW 400.

The information resource transmits, to the information apparatus 100, the detailed state information of the other information apparatus 200 that is uniquely specified by the manufacturing number of the other information apparatus 200 and the visible light information included in the access information.

The integrated information generator 143 receives the detailed state information of the other information apparatus 200 via the NW 400, antenna 132, and wireless communicator 130 (Step S206).

FIG. 5 shows the correspondence between the visible light information and device model, the detailed state information, and simplified state information (described later).

In FIG. 5, the detailed state information is set for every visible light information and device models of the other information apparatus 200. The information resource specifies the device model of the other information apparatus 200 based on the manufacturing number of the other information apparatus 200 included in the access information.

Furthermore, the information resource uniquely specifies the detailed state information of the other information apparatus 200 based on the specified device model of the other information apparatus 200 and the visible light information included in the access information. For example, if the device model of the other information apparatus 200 is DEVICE MODEL A and the visible light information is "20," the detailed state information of the other information apparatus 200 is "REMAINING BATTERY 20%." On the other hand, if the device model of the other information apparatus 200 is DEVICE MODEL B and the visible light information is 20, the detailed state information of the other information apparatus 200 is "REMAINING TIME 20 MINUTES."

Returning to FIG. 4, description will be continued. Next, the integrated information generator 143 make the memory 104 store the received detailed state information of the other information apparatus 200 (Step S207).

Furthermore, the display controller 144 displays an image of the detailed state information of the other information apparatus 200 stored in the memory 104 on the display 105 in a manner that the detailed state information is superimposed on a thorough-image obtained by imaging of the other information apparatus 200 (Step S208).

Figure 6B:
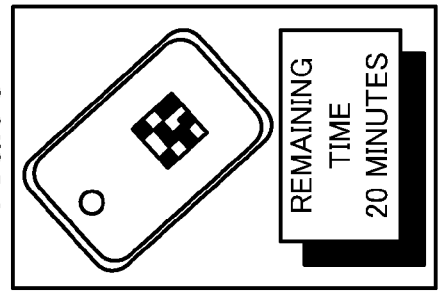
FIG. 6B is a drawing showing an exemplary image display by the information apparatus.
Figure 6C:
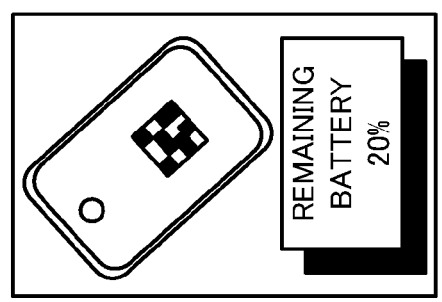
FIG. 6C is a drawing showing an exemplary image display by the information apparatus.

Consequently, for example, as shown in FIG. 6B and FIG. 6C, a live-viewing-image obtained by imaging of the other information apparatus 200 and an image of the detailed state information of the other information apparatus 200 superimposed on the live-viewing-image are displayed on the display 105.

Returning to FIG. 3, description will be continued. On the other hand, if no visible light pattern is recognized (Step S108; NO), then, the manufacturing number and apparatus state information acquirer 140 determines whether no visible light pattern can be recognized after a determined time has elapsed (Step S110).

For example, the manufacturing number and apparatus state information acquirer 140 monitors the elapsed time after the execution of the program for the visible light communication and acquisition of apparatus state information is started, and determines, when the elapsed time surpassed predetermined determined time, whether no visible light pattern can be recognized at that point If it is not the case where no visible light pattern can be recognized after a determined time has elapsed, in other words the determined time has not yet elapsed while no visible light pattern can be recognized (Step S110; NO), a sequence of operations is terminated.

On the other hand, if no visible light pattern can be recognized after a determined time has elapsed (Step S110, YES), the imaging controller 142 generates an image for warning the user that no visible light pattern can be recognized (a warning image for no recognizable visible light pattern).

The display controller 144 displays the warning image for no recognizable visible light pattern on the display 105 in a manner that the warning image is superimposed on a live-viewing-image obtained by imaging of the other information apparatus 200 (Step S111).

Figure 6D:
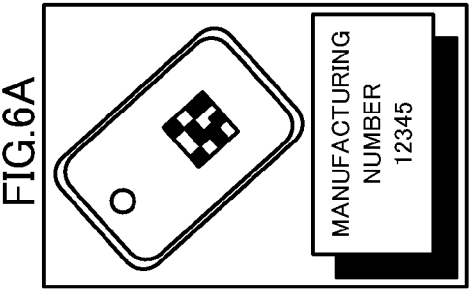
FIG. 6D is a drawing showing an exemplary image display by the information apparatus.
Figure 6E:
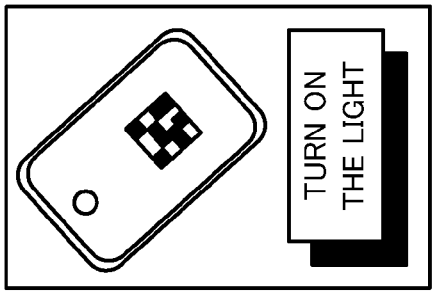
FIG. 6E is a drawing showing an exemplary image display by the information apparatus.

Consequently, for example, as shown in FIG. 6E, a live-viewing-image obtained by imaging of the other information apparatus 200 and an image for urging the user's response as the warning image for no recognizable visible light pattern superimposed on the live-viewing-image are displayed on the display 105.

On the other hand, if no two-dimensional bar code is recognized (Step S103; NO), the manufacturing number and apparatus state information acquirer 140 determines whether the manufacturing number of the other information apparatus 200 has been stored (Step S112).

For example, when a program for the visible light communication and acquisition of apparatus state information is executed and the manufacturing number of the other information apparatus 200 is stored in the memory 104, the manufacturing number of the other information apparatus 200 is stored in the memory 104 until the execution of the program for the visible light communication and acquisition of apparatus state information is over.

In such a scenario, the manufacturing number and apparatus state information acquirer 140 determines whether the manufacturing number of the other information apparatus 200 has been stored in the memory 104.

If the manufacturing number of the other information apparatus 200 has been stored (Step S112; YES), the processes of the Steps S107 through S111 are performed.

On the other hand, if the manufacturing number of the other information apparatus 200 has not been stored (Step S112; NO), then, the imager 114 and manufacturing number and apparatus state information acquirer 140 decodes the visible light pattern (Step S113).

Specifically, as is similar in the Step S107, the imager 114 generates a bit data string in which light-on is represented by '1' and light-off is represented by "0" based on change in brightness between the frames over time in the region of the blinking points generated by light emitted from the light emitter 120 (bright spot region) in each of predetermined amount of frames.

After that, the bit data string is stored and updated in the coordinates data list constituted in the buffer 116.

The manufacturing number and apparatus state information acquirer 140 acquires and tries to convert the bit data string to visible light information.

Next, the manufacturing number and apparatus state information acquirer 140 determines whether any visible light pattern is recognized (Step S114).

If any visible light pattern is recognized (Step S115; YES), the manufacturing number and apparatus state information acquirer 140 determines whether no two-dimensional bar code can be recognized after a determined time has elapsed (Step S115).

For example, the manufacturing number and apparatus state information acquirer 140 monitors the elapsed time after the execution of the program for the visible light communication and acquisition of apparatus state information is started, and determines, when the elapsed time surpassed the determined time, whether no two-dimensional bar code can be recognized at that point.

If no two-dimensional bar code can be recognized after the determined time has elapsed (Step S115; YES), the imaging controller 142 generates an image for warning the user that no two-dimensional bar code can be recognized (a warning image for no recognizable two-dimensional bar code).

The display controller 144 displays the warning image for no recognizable two-dimensional bar code on the display 105 in a manner that the warning image is superimposed on a live-viewing-image obtained by imaging of the other information apparatus 200 (Step S116).

Figure 6F:
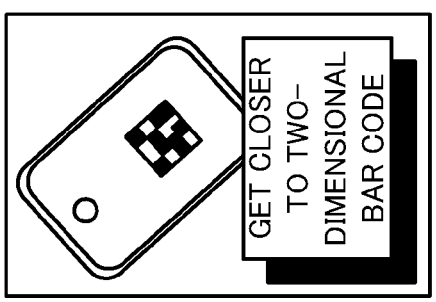
FIG. 6F is a drawing showing an exemplary image display by the information apparatus.
Figure 6G:
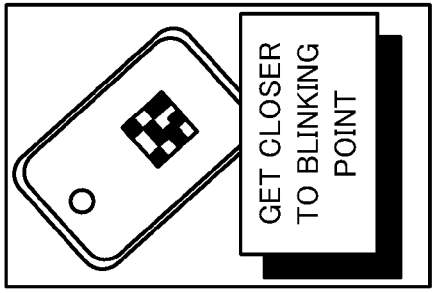
FIG. 6G is a drawing showing an exemplary image display by the information apparatus.

Consequently, for example, as shown in FIG. 6F and FIG. 6G, a live-viewing-image obtained by imaging of the other information apparatus 200 and an image for urging the user to respond as the warning image for no recognizable two-dimensional bar code superimposed on the live-viewing-image are displayed on the display 105.

After the warning image for no recognizable two-dimensional bar code is displayed (Step S116), or if it is not the case where no two-dimensional bar code can be recognized after the determined time has elapsed, in other words, if the determined time determined time has not yet elapsed while no two-dimensional bar code can be recognized (Step S115; NO), the controller 102 acquires simplified state information representing a simplified state of the other information apparatus 200 and displays the simplified state information on the display 105 (Step S117).

Specifically, operations which are the same as operations in the flowchart of FIG. 4 are performed in the Step S117.

Though, the detailed state information in FIG. 4 is replaced with the simplified state information in the Step S117 and there are following differences.

Specifically, since no two-dimensional bar code can be recognized and the manufacturing number of the other information apparatus 200 has not yet been acquired, a location inquiry information generated in the Step S202 and transmitted in the Step S203 does not include the manufacturing number of the other information apparatus 200. In such a scenario, the service server 300 transmits, upon receiving the location inquiry information, a predetermined location (URL) of information resource to the information apparatus 100.

Furthermore, the access information generated and transmitted in the Step S205 includes only the visible light information.

In such a scenario, since the access information does not include the manufacturing number of the other information apparatus 200, the information resource cannot specify the device model information of the other information apparatus 200.

Therefore, the information resource uniquely specifies, from simplified state information corresponding to NO DEVICE MODEL INFORMATION in FIG. 5, a simplified state information corresponding to the visible light information included in the access information, and transmits the specified simplified state information to the information apparatus 100.

For example, if there is no device model information of the other information apparatus 200 and the visible light information is 20, the simplified state information of the other information apparatus 200 is "20%."

Then, in Step S208, the integrated information generator 143 make the memory 104 store the received simplified state information of the other information apparatus 200.

Furthermore, the display controller 144 displays an image of the simplified state information of the other information apparatus 200 stored in the memory 104 on the display 105 in a manner that the simplified state information is superimposed on a live-viewing-image obtained by imaging of the other information apparatus 200.

Consequently, for example, as shown in FIG. 6D, a live-viewing-image obtained by imaging of the other information apparatus 200 and an image of the simplified state information of the other information apparatus 200 superimposed on the live-viewing-image are displayed on the display 105.

As described above, in the communication system 10 according to this embodiment, the information apparatus 100 images an image of the back face of the other information apparatus 200 to acquire the manufacturing number of the other information apparatus 200 corresponding to the two-dimensional bar code provided on the back face of the other information apparatus 200 and the visible light information corresponding to blinking of light emitted by the light emitter 120 arranged on the back face of the other information apparatus 200.

Furthermore, with this, the imager 114 is controlled so as to be able to image the two-dimensional bar code and the light emitted by the light emitter 120.

Consequently, the information apparatus 100 can acquire the manufacturing number of other information apparatus 200 and visible light information and thus can acquire various kinds of information.

Furthermore, the information apparatus 100 displays the detailed state information or simplified state information of the other information apparatus 200 corresponding to the manufacturing number and visible light information of the other information apparatus 200, and is capable of properly providing the state of the other information apparatus 200 to the user.

Furthermore, if no two-dimensional bar code or visible light patter can be recognized and therefore the manufacturing number or visible light information of the other information apparatus 200 cannot be acquired, the information apparatus 100 can display an image for warning thus, and is capable of giving proper instructions to the user for recognizing the two-dimensional bar code or visible light pattern by imaging again.

Furthermore, the information apparatus 100 transmits the access information for accessing the information resource including the manufacturing number and visible light information of the other information apparatus 200, and is capable of properly acquiring the detailed state information or simplified state information of the other information apparatus 200 corresponding to the manufacturing number and visible light information of the other information apparatus 200.

Furthermore, the two-dimensional bar code is fixed information associated with the manufacturing number of the other information apparatus 200, and the visible light information is arbitrarily changeable information associated with the state of the other information apparatus 200 and can be set in accordance with the nature of information.

The present disclosure is not limited to the above-described embodiment and drawings. The above-described embodiment and drawings can be appropriately modified.

For example, while the information apparatus 100 indirectly controls the imager 114 by displaying, when no two-dimensional bar code or visible light pattern can be recognized and therefore the manufacturing number or visible light information of the other information apparatus 200 cannot be acquired, an image for warning thus to urge the user to conduct operations in the above-described embodiment, the imaging controller 142 of the controller 102 can, for example, control the contrast and focus of the imager 114 so that the two-dimensional bar code or visible light pattern can be recognized.

Furthermore, while a two-dimensional bar code is arranged on the back face of the other information apparatus 200 in the above-described embodiment, this is not limiting. An OCR (optical character recognition) code or the like can be also utilized.

Furthermore, while the visible light pattern is expressed by blinking (change in brightness) in the above-described embodiment, multi-value bit data can be transmitted by using change in emitted light color of multiple colors (For example, R (red), G (green), and B (blue)) and no emission (black) where changes in emitted light color per unit time and changes in modes such as emission or no emission transmits the multi-value bit data.

Furthermore, the functions of the information apparatus 100 can be realized by, for example, a computer executing programs. Furthermore, the programs for realizing the functions of the information apparatus 100 can be stored on a non-transitory recording medium such as a CD-ROM or downloaded on a computer via a network.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An information acquisition apparatus comprising:
    an imager;
    a first decoder decoding a geometric pattern obtained by imaging by the imager to generate first information;
    a second decoder decoding a change in luminance over time obtained by continuous imaging by the imager to generate second information which comprises a bit data string; and
    an imaging controller controlling the imager to image the geometric pattern and the change in luminance over time.

2. The information acquisition apparatus according to claim 1, further comprising:
    an outputter outputting the first information and the second information.

3. The information acquisition apparatus according to claim 1 wherein the imaging controller controls the imager based on the first information and the second information.

4. The information acquisition apparatus according to claim 1 wherein
    the imaging controller controls the imager to repeat imaging when at least one of the first decoder and the second decoder fails in decoding.

5. The information acquisition apparatus according to claim 1, further comprising:
    a generator generating third information integrating the first information and the second information.

6. The information acquisition apparatus according to claim 5 wherein
    the third information includes information of a storage location of an information resource on a network to which the information acquisition apparatus is connected.

7. The information acquisition apparatus according to claim 1 wherein
    the first information is fixed information, and
    the second information is arbitrarily changeable information.

8. An information acquisition method including:
    an imaging step;
    a first decoding step of decoding a geometric pattern obtained by imaging in the imaging step to generate first information;
    a second decoding step of decoding a change in luminance over time obtained by continuous imaging in the imaging step to generate second information; and
    an imaging controlling step of controlling the imaging to image the geometric pattern and the change in luminance over time in the imaging step.

9. A computer-readable non-transitory recording medium storing a program for causing the computer to function as:
    an imager;
    a first decoder decoding a geometric pattern obtained by imaging by the imager to generate first information;
    a second decoder decoding a change in luminance over time obtained by continuous imaging by the imager to generate second information; and
    an imaging controller controlling the imager to image the geometric pattern and the change in luminance over time.

10. An information acquisition apparatus comprising:
    an imager;
    a first decoder decoding a geometric pattern obtained by imaging by the imager to generate first information;
    a second decoder decoding a pattern, which optically changes and cannot be decoded as independent information, obtained by imaging by the imager to generate second information; and
    an imaging controller controlling the imager to image the geometric pattern and the pattern.

11. An information acquisition method including:
    an imaging step;
    a first decoding step of decoding a geometric pattern obtained by imaging in the imaging step to generate first information;
    a second decoding step of decoding a pattern, which optically changes and cannot be decoded as independent information, obtained by imaging in the imaging step to generate second information; and
    an imaging controlling step of controlling the imaging to image the geometric pattern and the pattern in the imaging step.

12. A computer-readable non-transitory recording medium storing a program for causing the computer to function as:
    an imager;
    a first decoder decoding a geometric pattern obtained by imaging by the imager to generate first information;
    a second decoder decoding a pattern, which optically changes and cannot be decoded as independent information, obtained by imaging by the imager to generate second information; and
    an imaging controller controlling the imager to image the geometric pattern and the pattern.

* * * * *